F. SIMPSON & A. R. T. WOODS.
APPARATUS FOR MEASURING FLOW OF LIQUIDS IN CLOSED CONDUITS.
APPLICATION FILED SEPT. 12, 1910.
1,068,280.
Patented July 22, 1913.
2 SHEETS—SHEET 1.
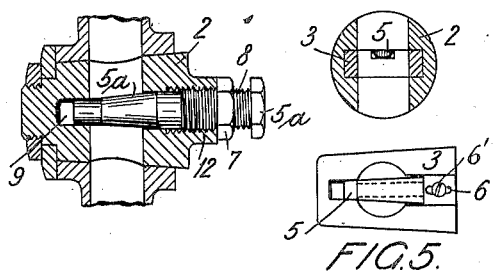
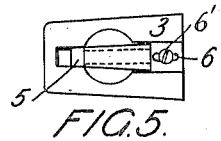
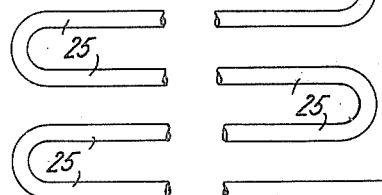
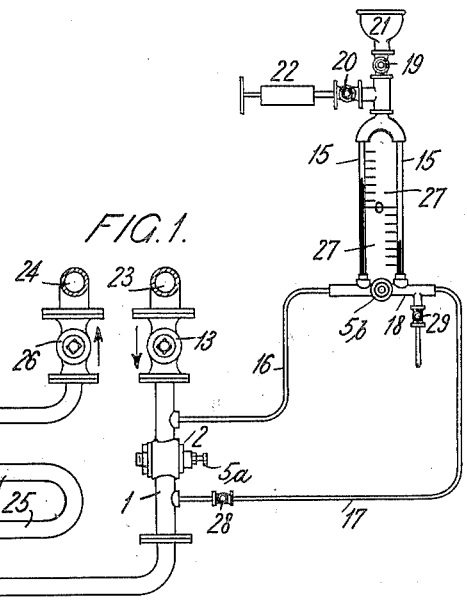
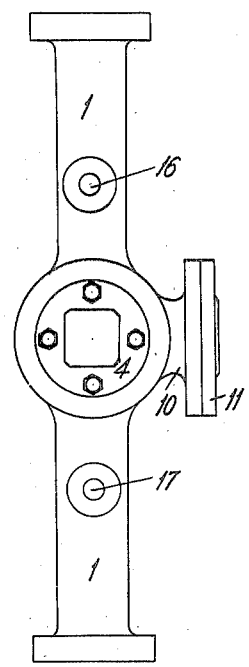
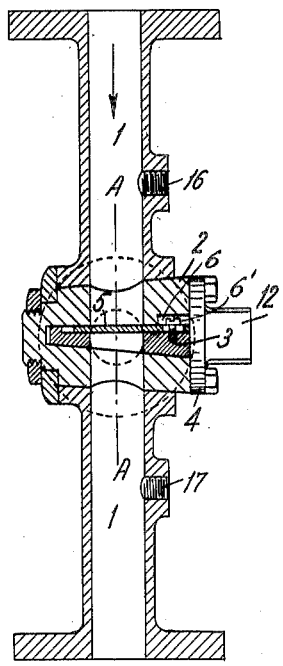
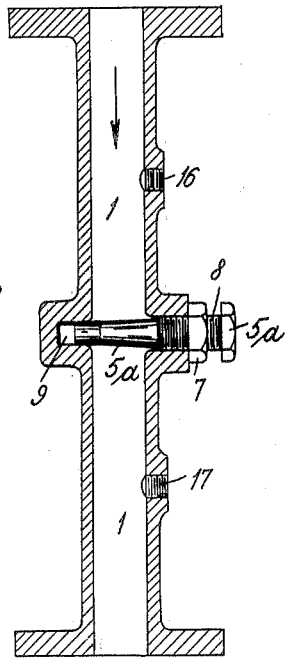

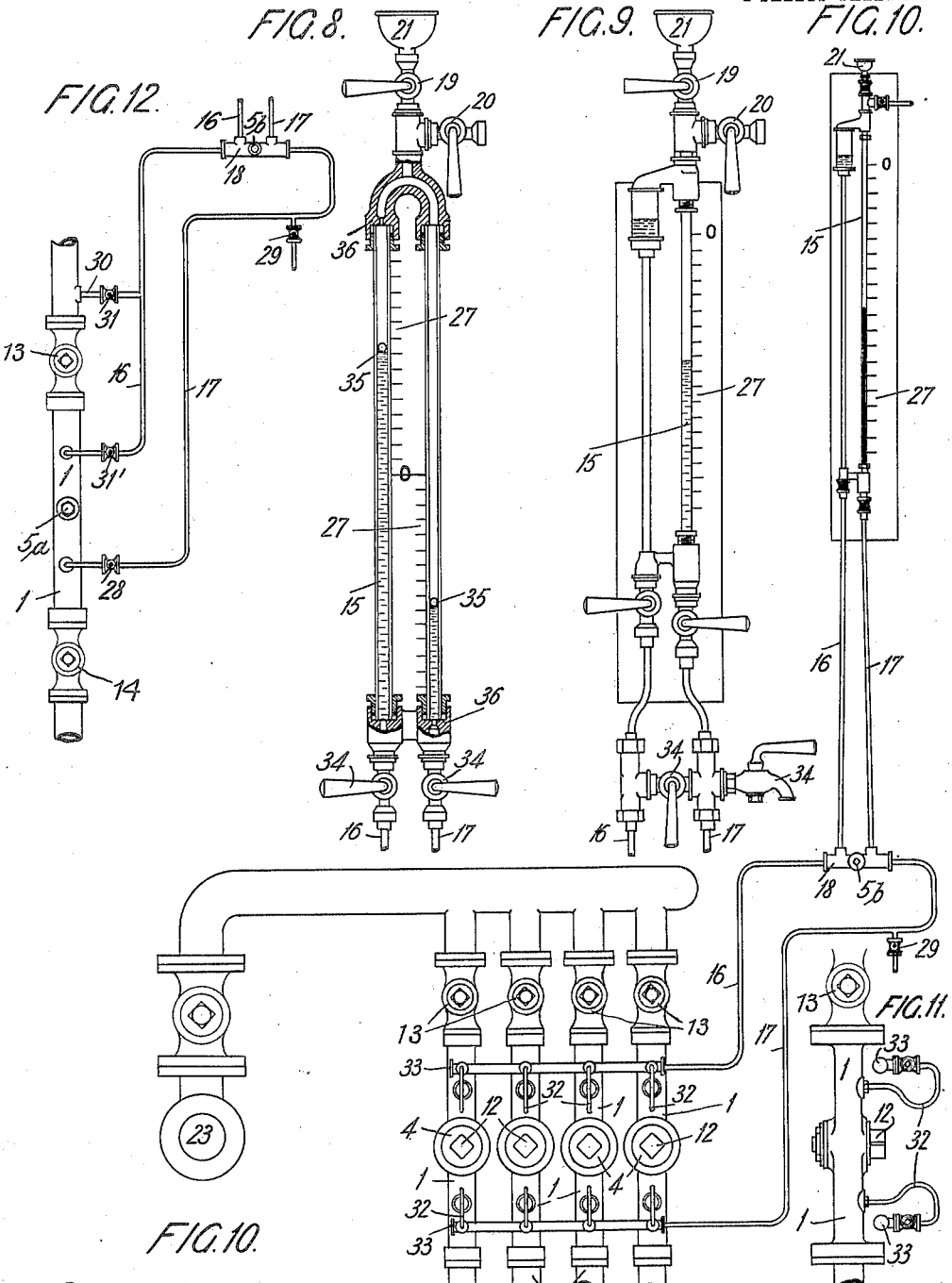

UNITED STATES PATENT OFFICE.

FRED SIMPSON, OF BLUNDELLSANDS, NEAR LIVERPOOL, AND ARTHUR ROBERT THOMAS WOODS, OF HARROW, NEAR LONDON, ENGLAND.

APPARATUS FOR MEASURING FLOW OF LIQUIDS IN CLOSED CONDUITS.

1,068,280. Specification of Letters Patent. Patented July 22, 1913.

Application filed September 12, 1910. Serial No. 581,513.

*To all whom it may concern:*

Be it known that we, FRED SIMPSON, a subject of the King of Great Britain, and residing at Blundellsands, near Liverpool, England, and ARTHUR ROBERT THOMAS WOODS, a subject of the King of Great Britain, formerly residing in Waterloo, near Liverpool, England, but now residing in Harrow, near London, England, have invented certain new and useful Improvements in Apparatus for Measuring the Flow of Liquids in Closed Conduits, of which the following is a specification.

This invention has reference to that well known class of apparatus in which the flow of a liquid through a closed conduit is measured by the fall of pressure or loss of head due to the friction of the liquid in passing between two fixed points in the conduit, between which points a suitable obstruction or constriction is usually located.

While our invention is applicable generally for measuring the flow of liquids in closed conduits it is specially applicable in connection with the cooled brine circulating systems of refrigerating plants, and we will in the first instance describe it in such connection. Where, as is usual, such circulating systems are closed and several circuits are arranged in parallel between common supply and return mains, it is obviously desirable to have means for measuring the flows through the various circuits individually, so that inequalities may be detected and rectified. It is also very desirable to have means to detect leakage in the individual circuits and to indicate the quantity of air that may be entrapped therein. We accordingly fit to each circuit, near the inlet end thereof, an apparatus of the type mentioned, the construction being as follows, reference being made to the accompanying drawings in which:—

Figure 1 is a diagrammatic view, (not to scale), showing a typical installation in its simplest form; Figs. 2 to 7 are detail views to larger scale showing a length or section of the brine circuit piping with the constricting device, (which we term the obstruent), fitted therein. Fig. 2 is an elevation in axial section, Fig. 3 is an elevation looking at right angles to the direction of view of Fig. 2, Fig. 4 is a section on the line A A of Fig. 2, and Fig. 5 is a plan of the block 3 and the obstruent 5. Figs. 6 and 7 show modified arrangements of the obstruent, these figures being analogous to Fig. 2. Fig. 8 shows one form of the gage for measuring the loss of head of the liquid in flowing past the obstruent, and Fig. 9 shows a slightly modified form thereof. Figs. 10 and 11 show the arrangement where a battery of circuits is served by the one gage, and Fig. 12 shows the arrangement of the gage connecting pipes for the simpler arrangement of obstruent fitted directly in the brine circuit pipe.

The portion of the circuit where the passageway is constricted should be a self-contained element, so arranged as to be readily accessible and removable without involving any material loss of brine or more than a brief interruption of the circuit. These conditions are most completely fulfilled by fitting the obstruent in a detachable manner in the plug of a cock fitted in the brine circuit pipe, as illustrated in Figs. 2 to 6, but the arrangement may obviously be simplified by fitting the obstruent directly in a short detachable length or section of the brine circuit pipe, as shown in Fig. 7, isolating cocks being fitted at or close to the ends of the section.

1 is the section of the brine circuit pipe, 2 is the cock plug fitted therein, 3 is a tapered block detachably fitted in a recess in the cock plug, (see Fig. 4) and held therein by the detachable cover 4 of the plug, and 5 is the cross bar which constricts the passage-way and is herein termed the obstruent.

The passage-way through the cock plug and the block 3 should conform with the bore of the pipe 1, so that the constriction is entirely due to the obstruent. The latter is made as a diametral crossbar, and its cross-section may take a variety of forms; in Figs. 2 to 5 it is shown as a cross bar of trapezoidal cross-section with sharp edges and with its widest face facing the stream. This form is specially suitable where hot liquids have to be dealt with, as for instance in a boiler feed water meter, as we have found that the temperature of the liquid has comparatively little effect on the coefficient of resistance to the flow past an obstruent of this form.

In order to permit of a slight variation in the effective width of the obstruent, so as to allow the apparatus to be calibrated within limits, we preferably make the obstruent of taper form, as shown in Fig. 5, and arrange it so that it can be slid in the direction of its length, that is across the pipe 1, in a slot in the block, being held by a set screw 6' passing through the slot hole 6.

For ordinary purposes it is generally preferable to make the obstruent in the form of a tapered bar of circular cross-section, as shown at $5^a$ in Fig. 6 and Fig. 7. This has the advantage that it can be very cheaply and accurately produced, and it has a constant ratio of thickness to width, and can be very readily adjusted. It is simply screwed through a suitable boss on the cock plug as in Fig. 6 or the side of the pipe as in Fig. 7, and secured by a lock-nut 7, a free length 8 and a clearance 9 being provided to allow for the axial movement transverse to the pipe already referred to for calibration purposes.

10 is a branch on the side of the pipe 1 which forms the shell of the cock, closed by a cap or flange 11; by removing this flange and turning the cock plug 2 through ninety degrees by its squared head 12, the brine circuit is shut off, and the obstruent can then be inspected and cleaned, or of course it may be withdrawn along with the block 3, by removing the cock plug cover 4.

In the simpler form shown in Fig. 7, (see also Fig. 12), the isolating cocks 13 and 14 being closed, the obstruent $5^a$ may be withdrawn, or the section 1 detached as a whole.

As already stated, the cross sectional form of the obstruent may take any desired shape, the characteristic feature of the obstruent being that it is in the form of a cross-bar fitted across the passage way, being preferably tapered and adjustable in the direction of its length, that is to say transversely to the axis of the pipe, so as to present a greater or less effective area to obstruct the passage way.

The gage 15 for measuring the loss of head due to the resistance to the flow of the liquid as it passes the obstruent, is in the form of an upright inverted U tube, transparent where necessary to show the liquid levels therein, and the lower ends of the legs of the gage are connected by the small branch pipes 16 and 17 to the two points in the pipe 1, on opposite sides of the obstruent, between which the loss of head is to be measured. These points should be at a sufficient distance from the obstruent to allow the stream of flowing liquid to be clear of any eddies formed by the action of the obstruent. The pipe 16 being on the supply side of the obstruent, transmits the major pressure to the gage, and 17 transmits the minor pressure. These pipes 16 and 17 are bridged below the gage by a small pipe 18 fitted with an obstruent $5^b$ similar in construction to the main obstruent already described, but on a considerably smaller scale. This small obstruent is preferably fitted in a cock plug, as in the case of the larger obstruent, so that the bridge pipe 18 may be closed and rendered inoperative. Otherwise it must be fitted with an ordinary stop cock between its connections to the gage. Normally the cock is closed, rendering the bridge pipe 18 inoperative.

When there is no flow through the brine circuit, the brine stands at the same level in both legs of the gage 15, and the space in the bend above the brine columns may be filled with air, but we preferably fill it with a liquid of less density than the brine, and not miscible with it. A suitable liquid in most cases is paraffin oil or the like, colored red. In order to adjust the liquid levels in the gage to suit the zero point, the top of the bend has a small branch with cocks 19 and 20, by which the liquid may be introduced into the gage from the cup 21 or liquid or air forced into the gage by the small pump 22. The action will be readily understood by a reference to Fig. 1, where 23 is the supply main and 24 the return main of the various brine circuits 25, and 13 and 26 the corresponding shut-off valves.

The cock plug 2 of the larger obstruent being open and that of the smaller obstruent being shut, the difference of levels of the brine in the two legs of the gage 15 will indicate the loss of head in passing the larger obstruent, and from this the velocity of flow can be found; by the means described, both levels may be raised or lowered so as to read equally above and below the zero points of the scale 27.

Where the bend is filled with air, the density of which may be neglected, the difference of levels may be taken to be the real loss of head; where the bend is filled with a liquid, then the difference of levels shown will be greater than the real loss of head, accordingly as the density of the liquid approaches more closely to that of the brine, and the scale 27 is accordingly then graduated in a more open manner.

Instead of graduating the scale to read heads, it may read brine velocities.

To test the circuit for leakage, the outlet shut-off valve 26 is closed and the circulating pressure is maintained. If the leakage be large, the resulting leakage flow through the circuit may be indicated through the larger obstruent, but in ordinary cases this will not be so; the larger obstruent is then closed and the smaller obstruent opened so that the leakage current must flow past it, and the indications being then very sensitive, the most minute leakage flow can be detected and measured by the gage 15.

To use the apparatus to detect the presence of air entrapped in the brine circuit 25, the shut-off valves 13 and 26 (Fig. 1) and the cock 28 are closed while the circuit is under pressure, the larger and smaller obstruents and the air cock 29 being opened; then any imprisoned air will expand with the relief of the pressure and will cause a current of brine past the smaller obstruent and out through the air cock 29 to atmosphere, and the amount of brine so ejected will be an indication of the amount of air entrapped in the circuit.

It will be noted that in Fig. 12, where the obstruent is fitted after the manner of Fig. 7, the inlet valve 13 must be shut to close the passage past the larger obstruent, and a special connecting pipe 30 must be fitted for the leakage test. This pipe is normally closed by the cock 31, but is opened to make a leakage test, the cock 31' being then closed so as to compel the leakage flow to pass through the smaller obstruent.

The arrangement shown in Figs. 10 and 11 differs from that of Fig. 1 inasmuch as a battery of brine circuits is served by the one gage 15. The arrangement is obvious, the several circuits 25 supplied from the main 23 being individually connected through the small pipes 32 to the small headers 33 which are connected by the pipes 16 and 17 as before to the gage 15. Cocks are fitted to each pipe 32, and by opening the cocks as required, the various circuits can be individually tested for flow or leakage or entrapped air, in the manner described.

Instead of making the gage 15 with legs of equal diameter, as in Figs. 1 and 8, in which case the columns rise and fall equally above and below the zero point, we generally prefer to make the one leg of comparatively large diameter at the liquid level, after the manner usual in siphon barometers as shown in Fig. 9, (it being understood that the upper part of the gage is filled with liquid). Under these circumstances the liquid level remains practically constant in the larger leg, and almost the whole variation in the head is shown in the other leg, the scale being made with correspondingly open graduations; the readings are taken from the one leg only, the other being of metal.

A drain cock 34 is shown in each leg of the gage by which the zero can be adjusted and the filling liquid drawn into the gage as required from the cup 21.

As there is some risk of the rising column being driven over the bend of the gage if the difference of pressure should increase unduly, as for instance in making a leakage test, we may use the known device of a float 35, (see Fig. 8), on the top of each brine column. These are adapted to act as shut-off valves against the seats 36 if the movement of the brine columns should be abnormally large. These floats will serve also to indicate by their depths of immersion, the relative densities of the brine and the liquid above.

While we have described our invention with reference to its application to a refrigerating brine circuit, it is of course not limited to such application, and may be used generally for measuring the velocity or quantity of a liquid flowing through a pipe.

In cases where it is not necessary to make leakage tests, the smaller obstruent $5^b$ may be dispensed with, but the bridge pipe 18 is preferably retained and fitted with a cock 34, as shown in Fig. 9, as it is useful in adjusting the liquid levels in the gage.

Having now fully described our invention, what we claim, and desire to secure by Letters Patent is;—

1. In combination; a pipe through which the rate of flow is to be measured, an obstruent in the form of a bar fitted across said pipe, the said bar having a width less than the diameter of the pipe so as to leave a passageway at each side of the bar, a gage for measuring the fall of pressure of the liquid in passing said obstruent, and pressure tubes connecting said gage to points in the pipe in front and rear of said obstruent; substantially as described.

2. In combination; a pipe through which the rate of flow is to be measured, an obstruent in the form of a tapered bar fitted across said pipe, the said bar having a width less than the diameter of the pipe so as to leave a passageway at each side of the bar, said obstruent being longitudinally adjustable so as to vary its obstructive effect, a gage for measuring the fall of pressure of the liquid in passing said obstruent, and pressure tubes connecting said gage to points in the pipe in front and rear of said obstruent; substantially as described.

3. In combination; a pipe through which the rate of flow is to be measured, a cock plug fitted in said pipe, an obstruent fitted in the passage-way of said plug, a gage for measuring the fall of pressure of the liquid in passing said obstruent, and pressure tubes connecting said gage to points in the pipe in front and rear of said obstruent; substantially as described.

4. In combination; a pipe through which the rate of flow is to be measured, a cock plug fitted in said pipe, an obstruent in the form of a tapered bar fitted in said plug across the passage-way thereof, said obstruent being longitudinally adjustable so as to vary its obstructive effect, a gage for measuring the fall of pressure of the liquid in passing said obstruent, and pressure tubes connecting said gage to points in the pipe in front and rear of said obstruent; substantially as described.

5. In combination; a pipe through which the rate of flow is to be measured, a cock plug fitted in said pipe, an obstruent fitted in the passage way of said plug, a side branch on the pipe alongside the plug so as to give access to the obstruent, a gage for measuring the fall of pressure of the liquid in passing said obstruent, and pressure tubes connecting said gage to points in the pipe in front and rear of said obstruent; substantially as described.

6. In combination; a pipe through which the rate of flow is to be measured, an obstruent in said pipe, a gage for measuring the fall of pressure of the liquid in passing said obstruent, pressure tubes connecting said gage to points in the pipe in front and rear of said obstruent, a bridge pipe fitted with a smaller obstruent arranged to connect the two gage tubes, and means for closing the passage way past either obstruent so that either obstruent may be used in conjunction with the one gage to indicate the rate of flow through the pipe; substantially as described.

7. In combination; a pipe through which the rate of flow is to be measured, an obstruent in the form of a cross bar in said pipe, a gage for measuring the fall of pressure of the liquid in passing said obstruent, pressure tubes connecting said gage to points in the pipe in front and rear of said obstruent, a bridge pipe fitted with a smaller obstruent arranged to connect the two gage tubes, and means for closing the passage way past either obstruent so that either obstruent may be used in conjunction with the one gage to indicate the rate of flow through the pipe; substantially as described.

8. In combination; a pipe through which the rate of flow is to be measured, an obstruent in the form of a tapered cross bar in said pipe, and longitudinally adjustable so as to vary its obstructive effect, a gage for measuring the fall of pressure of the liquid in passing said obstruent, pressure tubes connecting said gage to points in the pipe in front and rear of said obstruent, a bridge pipe fitted with a smaller obstruent arranged to connect the two gage tubes, and means for closing the passage way past either obstruent so that either obstruent may be used in conjunction with the one gage to indicate the rate of flow through the pipe; substantially as described.

9. In combination; a pipe through which the rate of flow is to be measured, a cock plug fitted in said pipe, an obstruent fitted in the passage way of said plug, a gage for measuring the fall of pressure of the liquid in passing said obstruent, pressure tubes connecting said gage to points in the pipe in front and rear of said obstruent; a bridge pipe fitted with a smaller obstruent arranged to connect the two gage tubes, and means for closing the passage-way past either obstruent; substantially as described.

10. In combination; a pipe through which the rate of flow is to be measured, a cock plug fitted in said pipe, an obstruent in the form of a tapered bar fitted in said plug across the passage-way thereof, said obstruent being longitudinally adjustable so as to vary its obstructing effect, a gage for measuring the fall of pressure of the liquid in passing said obstruent, pressure tubes connecting said gage to points in the pipe in front and rear of said obstruent; a bridge pipe fitted with a smaller obstruent arranged to connect the two gage tubes, and means for closing the passage way past either obstruent; substantially as described.

11. In combination; a pipe circuit through which the rate of flow is to be measured, an obstruent in said pipe, a gage for measuring the fall of pressure of the liquid in passing said obstruent, pressure tubes connecting said gage to points in the pipe in front and rear of said obstruent, a bridge pipe fitted with a smaller obstruent arranged to connect the two said pressure tubes, means for closing the passage way past either obstruent so that either obstruent may be used alternately in conjunction with the one gage to indicate the rate of flow through the pipe; means for closing the ends of the pipe circuit, and a cock opening to atmosphere in one of the said pressure tubes; substantially as described.

12. In combination; a pipe through which the rate of flow is to be measured, an obstruent in the form of a bar fitted across said pipe, a gage for measuring the fall of pressure of the liquid in passing said obstruent, pressure tubes connecting said gage to points in the pipe in front and rear of said obstruent, and cocks and a pump at the upper end of said gage for adjusting the quantity of fluid therein; substantially as described.

In testimony whereof, we affix our signatures in the presence of two witnesses.

FRED SIMPSON.
ARTHUR ROBERT THOMAS WOODS.

Witnesses:
ROBT. A. SLOAN,
JOSEPH E. HIRST.